United States Patent [19]
Miyazaki et al.

[11] Patent Number: 5,600,623
[45] Date of Patent: Feb. 4, 1997

[54] DISC DEVICE HAVING A PLURALITY OF HEADS EACH MOVABLE WITHIN A LIMITED DISTANCE

[75] Inventors: Benichi Miyazaki, Katano; Yukio Nishino, Nara-ken, both of Japan

[73] Assignee: Matsushita Electric Industrial Co., Ltd., Kadoma, Japan

[21] Appl. No.: 495,037

[22] Filed: Jun. 27, 1995

Related U.S. Application Data

[63] Continuation of Ser. No. 137,300, Oct. 15, 1993, abandoned.

[30] Foreign Application Priority Data

Oct. 20, 1992 [JP] Japan ..................................... 4-281396

[51] Int. Cl.$^6$ ..................................................... G11B 7/00
[52] U.S. Cl. .............................. 369/219; 369/13; 369/111
[58] Field of Search ..................................... 369/32, 44.28, 369/54, 58, 77.1, 77.2, 111, 13, 110, 99, 215, 219; 360/114, 105–109

[56] References Cited

U.S. PATENT DOCUMENTS

| | | | |
|---|---|---|---|
| 4,873,679 | 10/1989 | Murai et al. | 369/32 |
| 5,062,099 | 10/1991 | Odawara et al. | 369/77.1 X |
| 5,086,419 | 2/1992 | Yanagi | 369/44.28 |
| 5,166,918 | 11/1992 | Kamijo | 369/77.1 |
| 5,237,547 | 8/1993 | Ohkuma et al. | 369/13 |

FOREIGN PATENT DOCUMENTS

1-118246  5/1989  Japan.

*Primary Examiner*—W. R. Young
*Attorney, Agent, or Firm*—Ratner & Prestia

[57] ABSTRACT

A disc device accommodates a disc rotatably mounted therein, a plurality of first heads movable in a first direction radially of the disc, and a plurality of second heads movable in a second direction radially of the disc and perpendicular to the first direction. The disc has a first surface and a second surface opposite to each other, with an information area defined on at least one of the first and second surfaces. The information area is divided into an outer information region and an inner information region lying radially inwardly of the outer information region. The first heads are allowed to move within a limited distance across the outer information region so as to record or reproduce information on or from the outer information region, while the second heads are allowed to move within a limited distance across the inner information region so as to record or reproduce information on or from the inner information region.

3 Claims, 11 Drawing Sheets

DISC DEVICE HAVING A PLURALITY OF HEADS EACH MOVABLE WITHIN A LIMITED DISTANCE

This application is a continuation of application Ser. No 08/137,300 filed Oct. 15, 1993, now abandoned.

BACKGROUND OF THE INVENTION

1. Field of the Invention

The present invention relates generally to a disc device for recording or reproducing information on or from business image files, computer data files, or other editable data files, or for recording or reproducing information on or from a disc for use in an image player. In particular, the present invention relates to a disc device having a plurality of heads for recording or reproducing image information or the like.

2. Description of the Prior Art

In recent years, development of a disc device capable of digitally recording or reproducing dynamic images such as, for example, NTSC composite signals is being increasingly pursued by increasing the device-wide transfer rate. To this end, information to be recorded is divided into plural pieces of information, and divided information is combined for reproduction with the simultaneous use of a plurality of heads.

Japanese Laid-open Patent Publication (unexamined) No. 1-118246, filed on Oct. 30, 1987, discloses a disc device in which an increased transfer rate is obtained by recording or reproducing information with the simultaneous use of eight heads.

This disc device accommodates a disc having an information area divided radially equally into eight information regions. The disc device has four sliders each having two heads mounted thereon. Two of the sliders can move in a first direction radially of the disc and are disposed opposite to each other with respect to the center of the disc, while the other two sliders can move in a second direction radially of the disc and perpendicular to the first direction and are disposed opposite to each other with respect to the center of the disc. One of the two heads mounted on each slider is intended to record or reproduce information on or from one of four outer information regions, while the other head is intended to record or reproduce information on or from one of four inner information regions.

In such a conventional disc device, the heads are required to be reduced in size in order to avoid interference between the heads movable in the first direction and those movable in the second direction at an innermost circumferential area of the disc. Conversely, the use of heads of an ordinary size results in the interference between the heads at the innermost circumferential area and, hence, the problem arises that such an area cannot be used as the information area.

Furthermore, because the disc device must be so designed that the heads can move as far as the outer information area in both the first and second directions, the problem arises that the disc device inevitably becomes large in both of the directions. In applications where the use of a disc having a diameter of 300 mm is desired to achieve large capacity recording or to prolong the recording time, the width of the disc device exceeds 435 mm no matter which direction is chosen to be a direction widthwise of the disc device. Accordingly, the problem arises that installation of the disc device on a 19-inch rack which is inevitably required for business purposes is impossible.

SUMMARY OF THE INVENTION

The present invention has been developed to overcome the above-described disadvantages.

It is accordingly an object of the present invention to provide an improved disc device capable of achieving maximized utilization of an information area using one or more heads mounted therein so as to be movable in a first radial direction and one or more heads mounted therein so as to be movable in a second radial direction perpendicular to the first radial direction.

Another object of the present invention is to provide the disc device of the above-described type which is so designed as to have a reduced width for the purpose of installation thereof on a 19-inch rack. This disc device has a width of not greater than 435 mm even when a disc having a diameter of 300 mm is accommodated therein.

In accomplishing the above and other objects, the disc device according to the present invention comprises a housing and a disc accommodated in the housing and having a first surface and a second surface opposite to each other, said disc also having an information area defined on only the first surface and divided into an outer information region and an inner information region lying radially inwardly of the outer information region. The disc device further comprises first head means and second head means both mounted in the housing. The first head means is allowed to move in a first direction radially of the disc within a limited distance across the outer information region so as to record or reproduce information on or from the outer information region, respectively. The second head means is allowed to move in a second direction radially of the disc within a limited distance across the inner information region so as to record or reproduce information on or from the inner information region, respectively. The second direction is so chosen as to be perpendicular to the first direction.

Each of the first and second head means includes one head or two heads disposed on respective sides of a center of the disc.

Advantageously, the disc device further comprises a control means for controlling the first and second head means simultaneously so that simultaneous recording or reproduction is carried out by dividing information or combining divided information.

Conveniently, the housing has a slot defined therein through which the disc is removably mounted in the housing, and the direction of insertion of the disc into the housing is so chosen as to be in agreement with the first direction.

The disc may have the information area on each of the first and second surfaces thereof. In this case, the disc device includes two sets of first head means confronting the first and second surfaces of the disc, respectively, and two sets of second head means confronting the first and second surfaces of the disc, respectively.

Preferably, one set of the first head means and one set of the second head means are controlled simultaneously by a first control means, while the other set of the first head means and the other set of the second head means are controlled simultaneously by a second control means.

Conveniently, each of the outer and inner information regions has an equal number of information tracks each extending 360° about the center of the disc, and each of the information tracks is divided into at least one address portion and at least one data portion. In this case, recording on or reproduction from the data portion is carried out at one of a plurality of transfer rates according to the location of the information tracks radially of the disc, and the control means maintains constant the sum of a first transfer rate at which recording on or reproduction from one of the data portions is carried out by each set of the first head means and a second transfer rate at which recording on or reproduction from another data portion is carried out by associated set of the second head means.

By the above-described construction, it is sufficient if the first head means confronts only the outer information region, while the second head means confronts only the inner information region. Accordingly, even when heads of an ordinary size are employed as the first and second head means, no mechanical interference takes place between the first head means and the second head means at an innermost circumferential area of the disc. Because of this, not only the use of special heads of a small size is not required, but also the information area can effectively be utilized.

Furthermore, because it is sufficient if the second head means confronts only the inner information region, the size of the disc device in the second direction can be reduced. In applications where the use of a disc having a diameter of 300 mm is desired, the size of the disc device in the second direction can be reduced to a size of not greater than 435 mm and, hence, the disc device can be readily installed on a 19-inch rack.

The disc device according to the present invention also realizes large capacity recording on a disc of a type wherein the transfer rate of at least the data portions varies according to the location of the information tracks radially of the disc. In this case, recording or reproduction is carried out at a constant transfer rate by controlling the first and second head means so that the sum of the aforementioned first and second transfer rates may be maintained constant. As a result, digital information such as, for example, NTSC composite signals can be readily recorded on or reproduced from the disc.

Even if the disc device is of a type in which the disc is removably mounted therein, loading and unloading of the disc in or from the disc device can be easily carried out by rendering the direction of insertion of the disc to the disc device to be in agreement with the first direction and by directing that side wall of the housing which has a slot defined therein frontwardly of the 19-inch rack.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
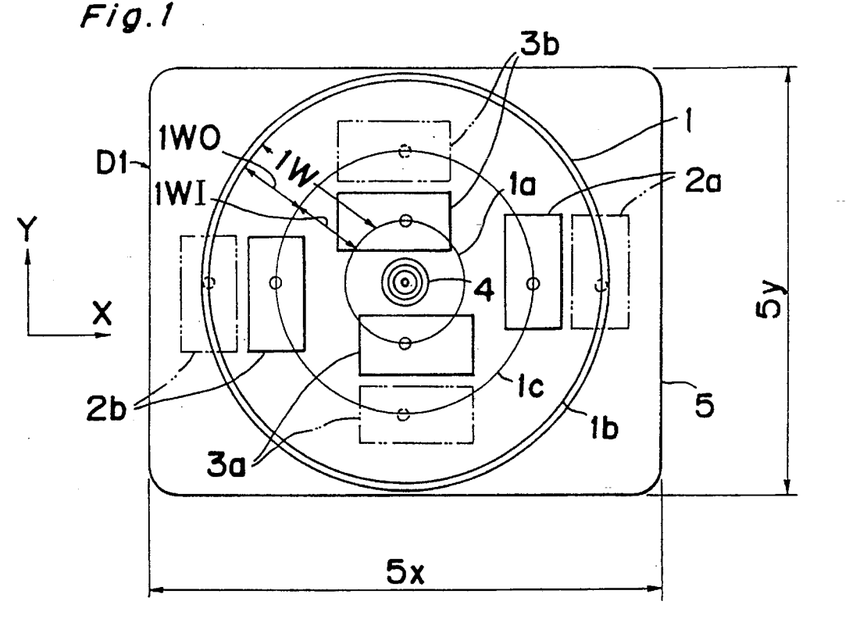
FIG. 1 is a schematic top plan view of an essential portion of a disc device according to a first embodiment of the present invention.

Referring now to the drawings, there is schematically shown in FIG. 1 a disc device D1 according to a first embodiment of the present invention in which a disc 1 such as, for example, an optical disc is accommodated.

The disc 1 has an information area 1W on or from which information is recorded or reproduced, respectively. The information area 1W is divided by an intermediate boundary 1c into an inner information region 1WI, having a spiral information track or a plurality of coaxially aligned information tracks, and an outer information region 1WO having a spiral information track or coaxially aligned information tracks equal in number to those in the inner information region 1WI. The inner information region 1WI is delimited between an inner boundary 1a and the intermediate boundary 1c, while the outer information region 1WO is delimited between the intermediate boundary 1c and an outer boundary 1b.

In practice, the spiral information track, although continuous from one end to the opposite end, includes a plurality of turns each in the form of a groove extending 360° about an axis of rotation of the disc 1. However, for the purpose of illustration of the present invention, each turn of the spiral information track is hereinafter referred to as a single information track since the turns of the spiral information track can be considered analogous to the coaxially aligned information tracks.

Figure 2:
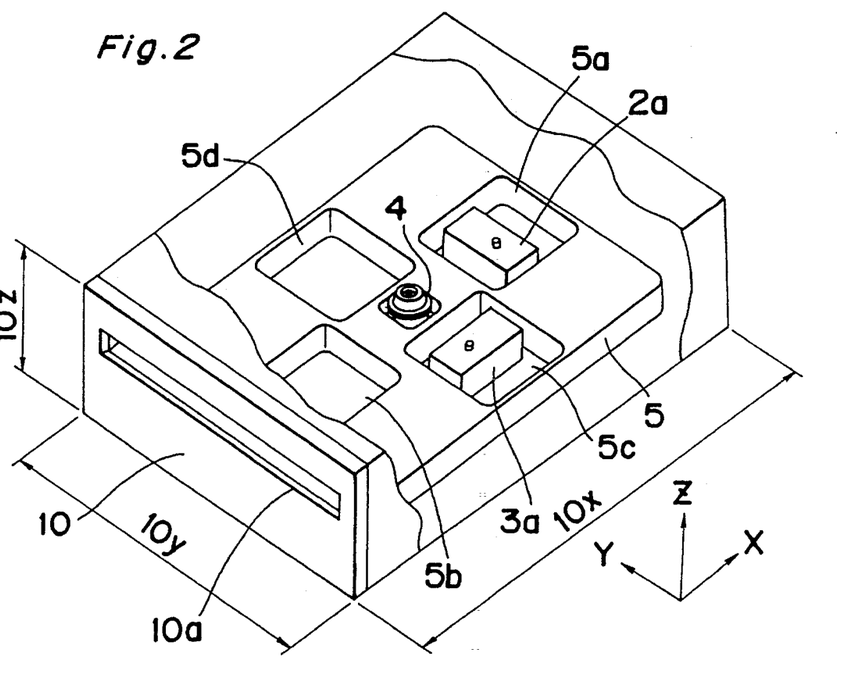
FIG. 2 is a partially cutaway perspective view of the disc device according to a standard specification.

FIG. 2 depicts the disc device according to a standard specification (hereinafter referred to simply as a standard specification device), which comprises a box-like housing 10, a generally rectangular drive base 5 accommodated in the housing 10, and a disc drive motor 4 disposed at the center of the drive base 5 for driving the disc 1 mounted thereon. The housing 10 has a length of 10x, a width of 10y, and a height of 10z, as shown in FIG. 2. The drive base 5 has a length of 5x and a width of 5y, as shown in FIG. 1.

The drive base 5 has four generally rectangular recesses 5a–5d defined therein. Two recesses denoted by 5a and 5b are in line with each other in a first direction radially of the disc 1, i.e, in the X direction, while the other two recesses denoted by 5c and 5d are in line with each other in a second direction radially of the disc and perpendicular to the first direction, i.e., in the Y direction. However, the recesses 5a and 5b are farther away from the center of the drive base 5 than the recesses 5c and 5d. The recesses 5a and 5c are positioned opposite to the recesses 5b and 5d, respectively, with respect to the center of the drive base 5. In short, the four recesses 5a, 5b, 5c, and 5d are formed on the +X axis side, –X axis side, –Y axis side, and +Y axis side of the drive base 5, respectively.

The standard specification device further comprises a first head 2a accommodated in the recess 5a and a second head 3a accommodated in the recess 5c, as shown in FIG. 2. The standard specification device has a slot 10a defined in that side wall of the housing 10 which is positioned on the –X axis side thereof. A disc cartridge (not shown) accommodating the disc 1 is inserted into the standard specification device through the slot 10a so that the disc 1 may be driven by the disc drive motor 4. The standard specification device also comprises a control means 11 electrically connected to the first and second heads 2a and 3a to thereby control the movement of the first head 2a and that of the second head 3a in association with each other. The control by the control means 11 is discussed later with reference to FIG. 4.

Figure 3:
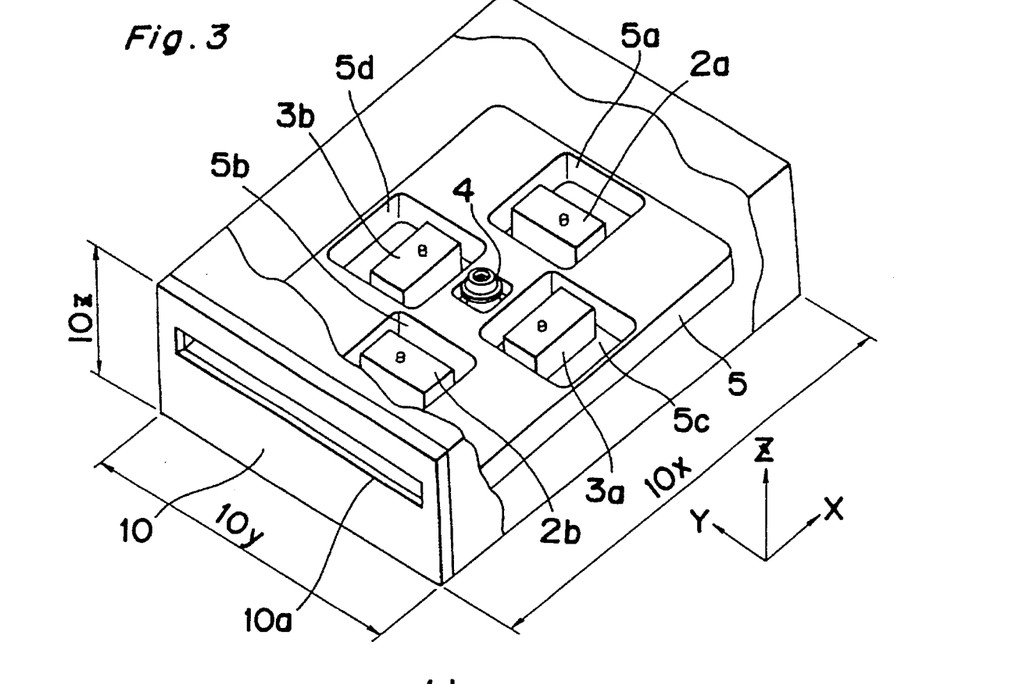
FIG. 3 is a view similar to FIG. 2, but indicating the disc device according to an optional specification.

FIG. 3 depicts the disc device according to an optional specification (hereinafter referred to simply as an optional specification device), which is similar in structure to the standard specification device except that the optional specification device has another first head 2b accommodated in the recess 5b and another second head 3b accommodated in the recess 5d.

As clearly shown in FIGS. 2 and 3, each of the first and second heads 2a, 2b, 3a, and 3b is allowed to move within a space delimited by the associated recess. Because the distance between the recesses 5a and 5b and the center of the drive base 5 differs from that between the recesses 5c and 5d and the center of the drive base 5, the first heads 2a and 2b accommodated in the former are allowed to move between the outer boundary 1b and the intermediate boundary 1c of the disc 1, while the second heads 3a and 3b accommodated in the latter are allowed to move between the intermediate boundary 1c and the inner boundary 1a. In FIG. 1, the heads indicated by solid lines are at respective innermost positions, whereas those indicated by phantom lines are at respective outermost positions.

The standard specification device operates as follows.

During recording, the first and second heads 2a and 3a are initially moved to a specific location of the outer information region 1WO on which recording is desired and a specific location of the inner information region 1WI on which recording is desired, respectively. Then, a desired information signal to be recorded is divided into two information signals, which are in turn simultaneously recorded on the outer information region 1WO and the inner information region 1WI with the use of the first and second heads 2a and 3a, respectively.

During reproduction, the first and second heads 2a and 3a are moved to a specific location of the outer information region 1WO from which reproduction is desired and a specific location of the inner information region 1WI from which reproduction is desired, respectively. An information signal recorded on the outer information region 1WO and that recorded on the inner information region 1WI are then simultaneously reproduced by the first and second heads 2a and 3a, respectively, and are combined for subsequent reproduction of a desired information signal.

During recording or reproduction, the control means 11 controls the first and second heads 2a and 3a so that the desired information signal may be divided into two information signals or the divided information signals may be combined into the original information signal by the first and second heads 2a and 3a.

Figure 4:
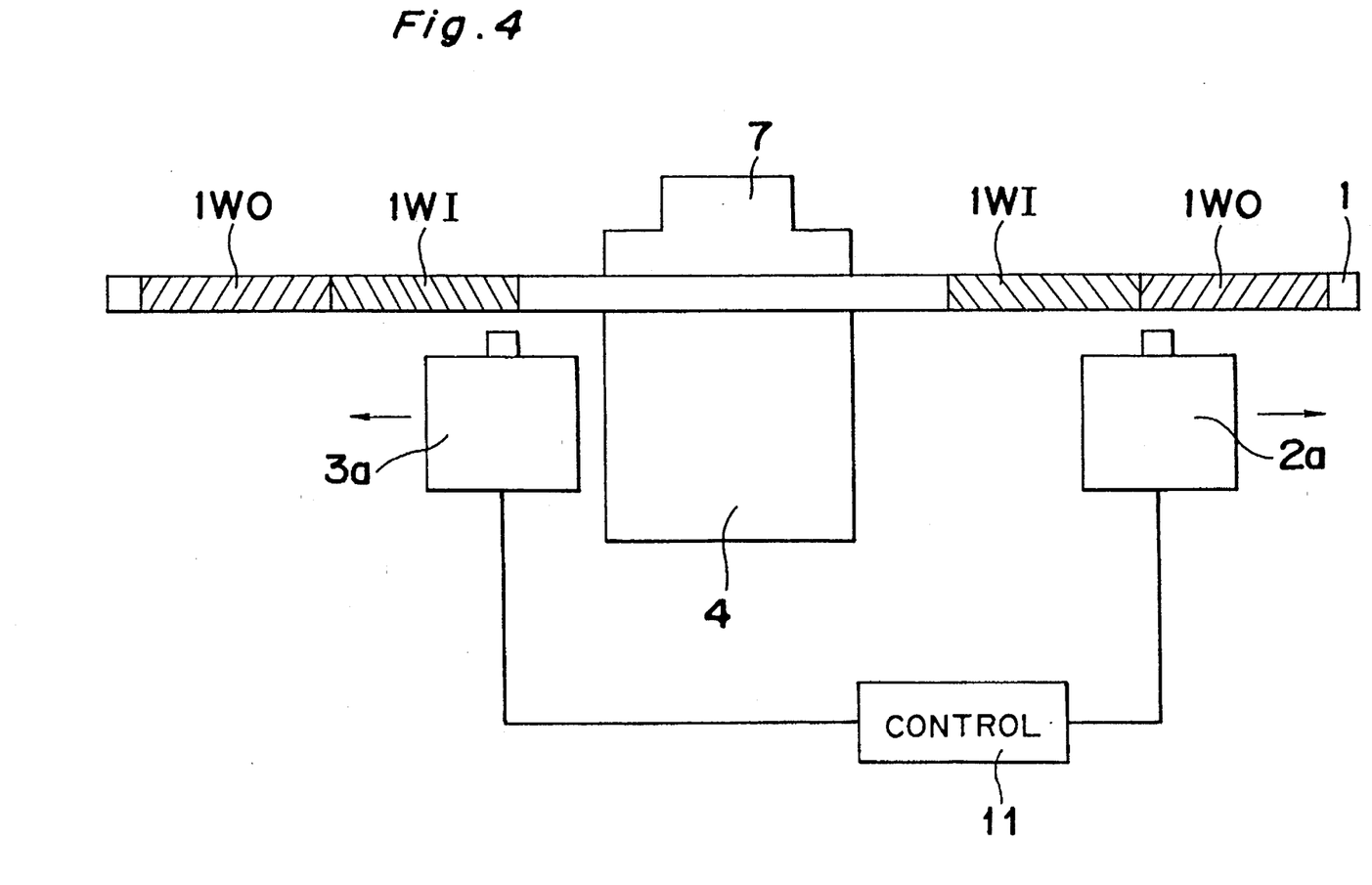
FIG. 4 is a schematic side view of the essential portion of the disc device of FIG. 2, particularly indicating how to control two heads movably mounted therein.

FIG. 4 depicts the control by the control means 11 wherein, when the first head 2a is moved radially outwardly from an innermost circumferential area of the outer information region 1WO, the second head 3a is moved radially outwardly from an innermost circumferential area of the inner information region 1WI. In contrast, when the first head 2a is moved radially inwardly from an outermost circumferential area of the outer information region 1WO, the second head 3a is moved radially inwardly from an outermost circumferential area of the inner information region 1WI.

On the other hand, the optional specification device operates as follows.

As is the case with the standard specification device, a desired information signal is recorded on or reproduced from the disc 1 by pairing the first and second heads 2a and 3a. Furthermore, another desired information signal is recorded on or reproduced from the disc 1 by pairing the first and second heads 2b and 3b. Because two information signals are independently manipulated by the two head pairs, an information signal recorded on the disc 1 by a first head pair can be immediately reproduced by a second head pair. Also, a first information signal recorded on or reproduced from a first information track by the first head pair can be continued to a second information signal recorded on or reproduced from a second information track remote from the first information track by the second head pair. Control of each of the first and second head pairs is the same as that of the first and second heads 2a and 3a in the standard specification device.

Accordingly, it is sufficient if the first heads 2a and 2b which can move in the X direction confront only the outer information region 1WO, and the second heads 3a and 3b which can move in the Y direction confront only the inner information region 1WI. Even when heads of an ordinary size are employed as the first and second heads 2a, 2b, 3a, and 3b, no mechanical interference takes place between the first heads 2a and 2b and the second heads 3a and 3b at the innermost circumferential area of the disc 1. Because of this, not only the use of special heads of a small size is not required, but also the innermost circumferential area of the information area can effectively be utilized.

Moreover, because it is sufficient if the second heads 3a and 3b confront only the inner information region 1WI, the size 5y of the drive base 5 in the Y direction in which these heads 3a and 3b are movable can be reduced and, hence, the size 10y of the disc device can also be reduced. Particularly, in applications where the use of a disc having a diameter of 300 mm is desired, the size 10y of the disc device can be reduced to a size of not greater than 435 mm, thus enabling installation thereof on a 19-inch rack.

Even if the disc device D1 is of a type in which the disc 1 is removably mounted therein, loading and unloading of the disc 1 in or from the disc device D1 can be easily carried out by rendering the direction of insertion of the disc 1 to the disc device D1 to be in agreement with the X direction and by directing the side wall of the housing 10 having the slot 10a frontwardly of the 19-inch rack.

In the above-described embodiment, although the first heads 2a and 2b are accommodated in the recesses 5a and 5b, respectively, these heads 2a and 2b may be accommodated in the recesses 5b and 5a, respectively. Likewise, the second heads 3a and 3b may be accommodated in the recesses 5d and 5c, respectively.

Furthermore, as shown in FIGS. 2 and 3, although the first head 2a and the second head 3a are employed as the heads according to the standard specification, they can be used as those according to the optional specification. Likewise, the first head 2b and the second head 3b can be used as the heads according to the standard specification.

In the above-described embodiment, although simultaneous recording or reproduction is carried out by dividing an information signal into two information signals or by combining the two divided information signals with the use of the first head pair or the second head pair, simultaneous recording or reproduction can be carried out by dividing an information signal into four information signals or by combining the four divided information signals, using all of the four heads 2a, 2b, 3a, and 3b as one set.

Figure 5:
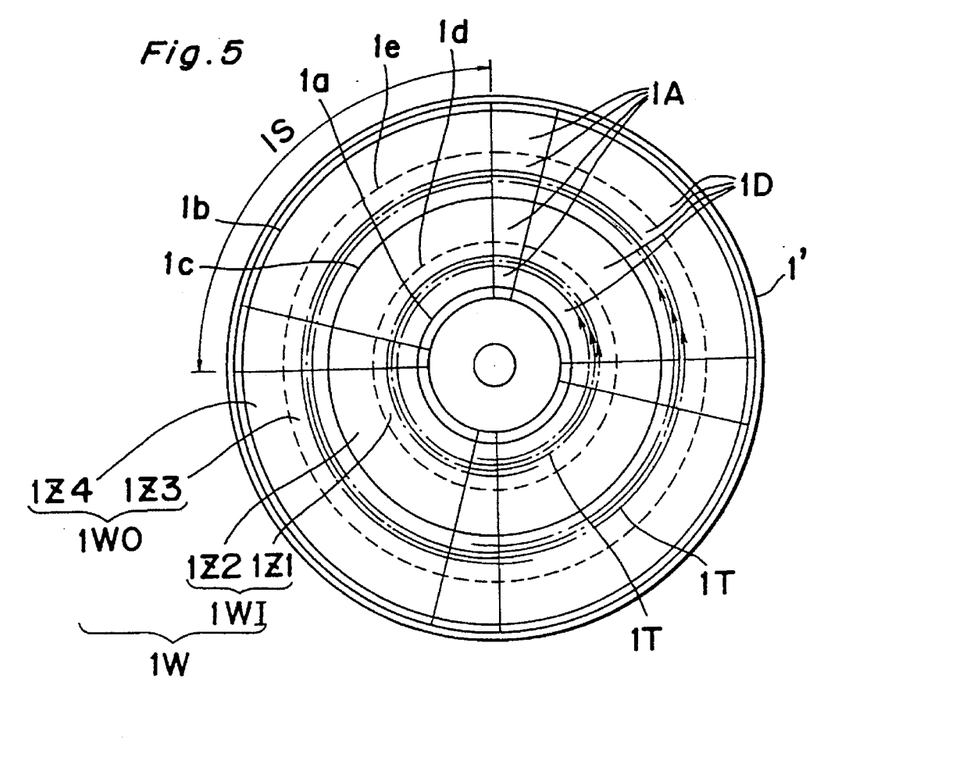
FIG. 5 is a top plan view of a disc mounted in the disc device.

FIG. 5 depicts a disc 1' such as, for example, an optical disc accommodated in a disc device D2 according to a second embodiment of the present invention. The disc 1' has a first surface and a second surface opposite to each other, and also has an information area 1W defined on each of the first and second surfaces.

In general, discs, particularly optical discs, have a spiral information track or a plurality of coaxially aligned information tracks defined on at least one of the opposite surfaces, along which recording or reproduction of information signals is carried out.

The MCAV (Modified Constant Angular Velocity) recording method is known whereby information can be recorded at a higher density when the disc is rotated at a constant speed, the linear velocity is higher at an outer circumferential area thereof than at an inner circumferential area thereof. According to the MCAV method, recording on the outer circumferential area is carried out at a higher transfer rate than that on the inner circumferential area.

The CAV (Constant Angular Velocity) recording method is also known whereby recording is carried out at a constant speed, regardless of on which area information is recorded. According to the CAV method, the transfer rate is relatively low because it is determined by a transfer rate at which information is recorded on the inner circumferential area.

Accordingly, more information can be recorded on the disc by the MCAV method than by the CAV method. According to the MCAV method, because the transfer rate is varied in proportion to the linear velocity, marks or pits optically recorded on the disc are of a substantially identical size or length.

In this embodiment, recording on the disc 1' shown in FIG. 5 is carried out by the MCAV method mentioned above and is hereinafter discussed in detail with reference to FIGS. 5 and 6.

As described previously, the disc 1' has the information area 1W on each of the opposite surfaces. As is the case with the disc 1 shown in FIG. 1, the information area 1W is divided by an intermediate boundary 1c into an inner information region 1WI having a plurality of information tracks 1T and an outer information region 1WO having information tracks 1T equal in number to those in the inner information region 1WI. The inner information region 1WI is delimited between an inner boundary 1a and the intermediate boundary 1c, while the outer information region 1WO is delimited between the intermediate boundary 1c and an outer boundary 1b.

The inner information region 1WI is further divided into a first information region 1Z1 and a second information region 1Z2 by an intermediate boundary 1d, while the outer information region 1WO is further divided into a third information region 1Z3 and a fourth information region 1Z4 by another intermediate boundary 1e. Each of the first to fourth information regions 1Z1–1Z4 has an equal number of information tracks 1T. The first information region 1Z1 is delimited between the inner boundary 1a and the intermediate boundary 1d, and the second information region 1Z2 is delimited between the intermediate boundary 1d and the intermediate boundary 1c. Furthermore, the third information region 1Z3 is delimited between the intermediate boundary 1c and the intermediate boundary 1e, and the fourth information region 1Z4 is delimited between the intermediate boundary 1e and the outer boundary 1b.

Each of the information tracks 1T is divided into four sectors 1S, each of which is further divided into an address portion 1A and a data portion 1D. Recording on the first to fourth information regions 1Z1–1Z4 is carried out at four different transfer rates, and the quantity of information which can be recorded on one sector 1S increases from the first information region 1Z1 towards the fourth information region 1Z4. However, address information is recorded on the address portion 1A at a constant transfer rate.

Figure 6A:
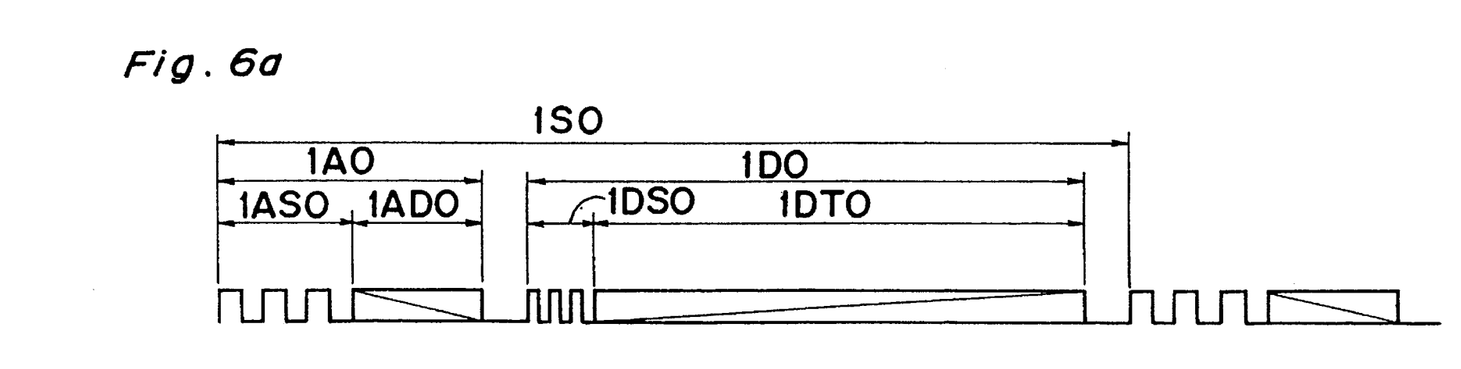
FIG. 6a is a waveform diagram of a signal reproduced from one sector of an outer information region of the disc.
Figure 6B:
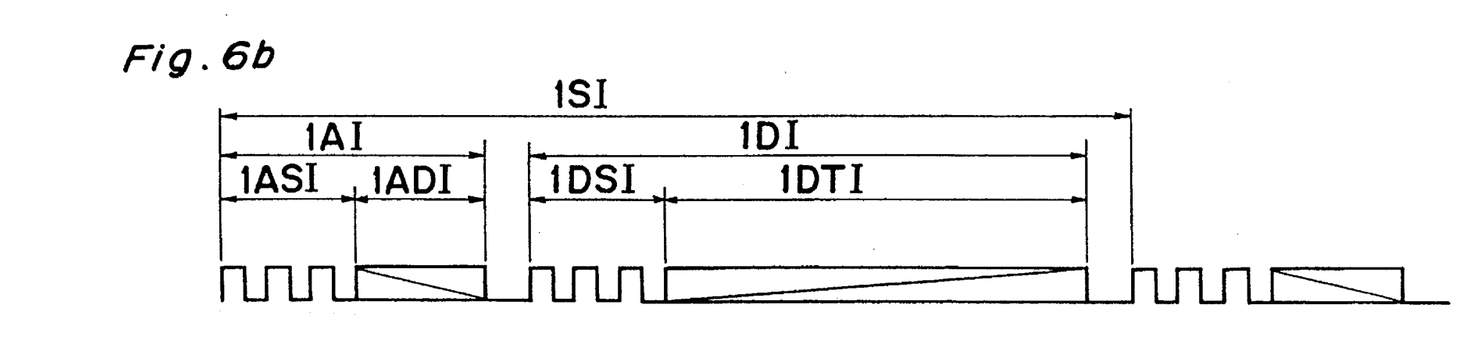
FIG. 6b is a diagram similar to FIG. 6a, but indicating a signal reproduced from one sector of an inner information region of the disc.

FIG. 6a indicates a signal reproduced from one sector 1SO of the outer information region 1WO, and FIG. 6b indicates a signal reproduced from one sector 1SI of the inner information region 1WI.

As shown in FIGS. 6a and 6b, the sector 1SO of the outer information region 1WO is made up of an address portion 1AO and a data portion 1DO, while the sector 1SI of the inner information region 1WI is made up of an address portion 1AI and a data portion 1DI. At the outer information region 1WO, the address portion 1AO is made up of an address sync signal region 1ASO for decoding address information, and an address information region 1ADO, while the data portion 1DO is made up of a data sync signal region 1DSO for decoding user's data information, and a user's data information region 1DTO on which user's data information is recorded. Likewise, the address portion 1AI of the inner information region 1WI is made up of an address sync signal region 1ASI for decoding address information, and an address information region 1ADI, while the data portion 1DI of the inner information region 1WI is made up of a data sync signal region 1DSI for decoding user's data information, and a user's data information region 1DTI on which user's data information is recorded.

As can be known from these figures, more user's data information can be recorded on the outer user's data information region 1DTO than on the inner user's data information region 1DTI. However, the time required for recording or reproducing information on or from the user's data information region 1DTO or 1DTI within each sector 1S is rendered to be an equal length, regardless of the location of the user's data information region 1DTO or 1DTI. Accordingly, the transfer rate at the user's data information region 1DTO or 1DTI is varied according to the location where recording is carried out. In other words, a data sync signal is recorded on the outer data sync signal region 1DSO at a frequency higher than the frequency at which the data sync signal is recorded on the inner data sync signal region 1DSI. However, recording on the address portion 1AO or 1AI is carried out at a constant transfer rate, regardless of the recording region, and hence, the frequency at which an address sync signal is recorded on the outer address sync signal region 1ASO is equal to the frequency at which the address sync signal is recorded on the inner address sync signal region 1ASI.

Figure 7:
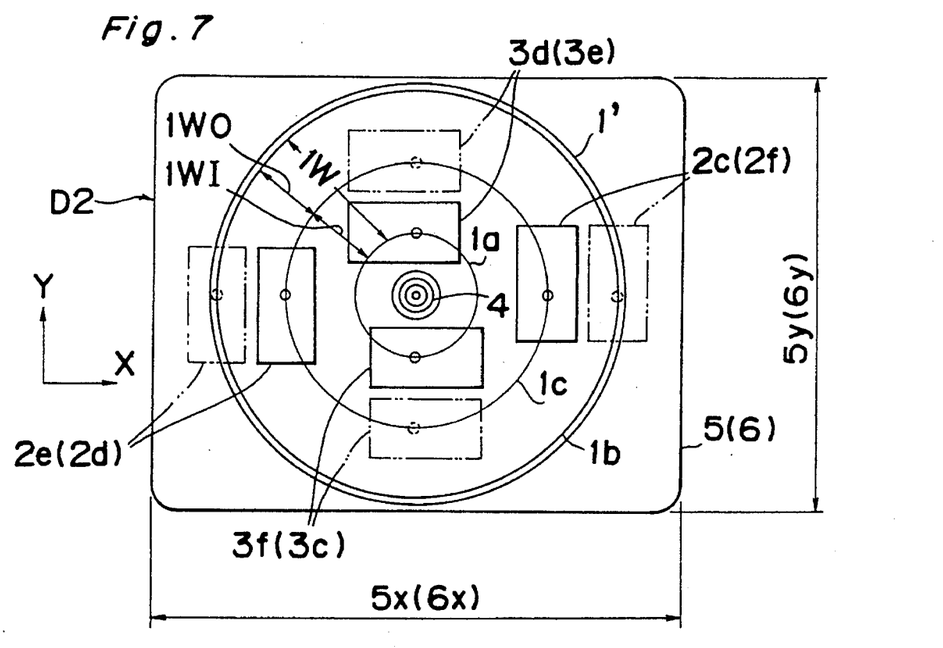
FIG. 7 is a view similar to FIG. 1, but according to a second embodiment of the present invention.
Figure 9:
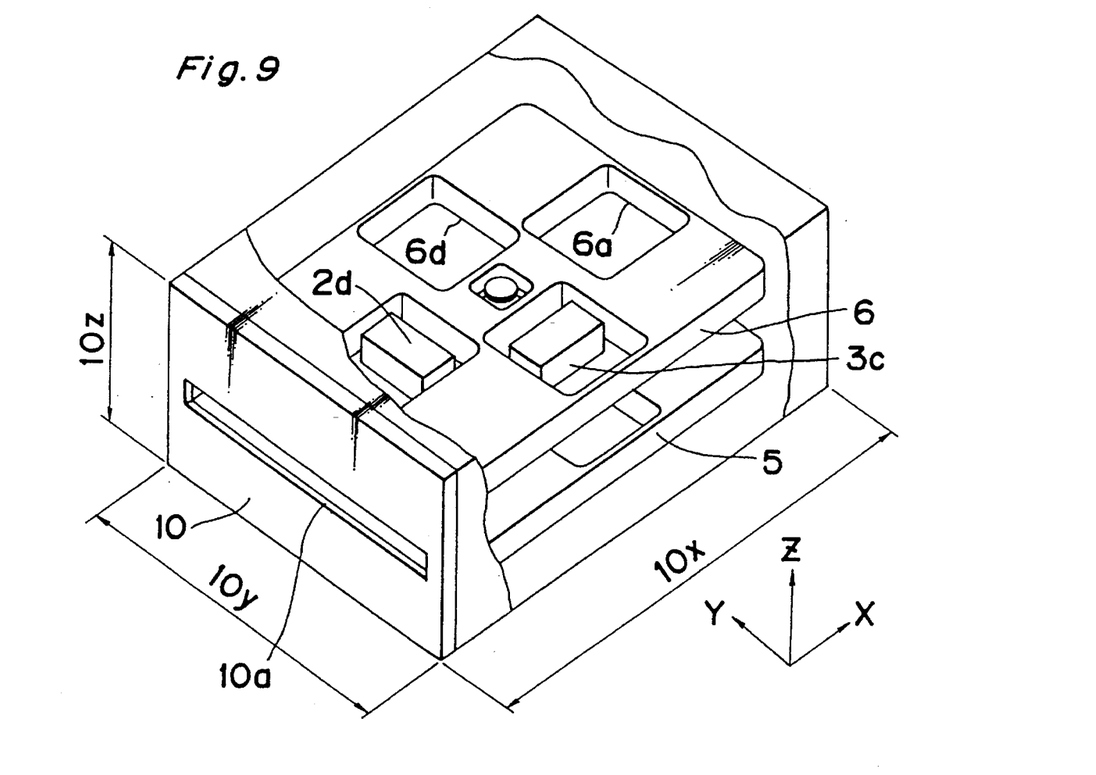
FIG. 9 is a view similar to FIG. 2, but according to the second embodiment of the present invention.
Figure 11:
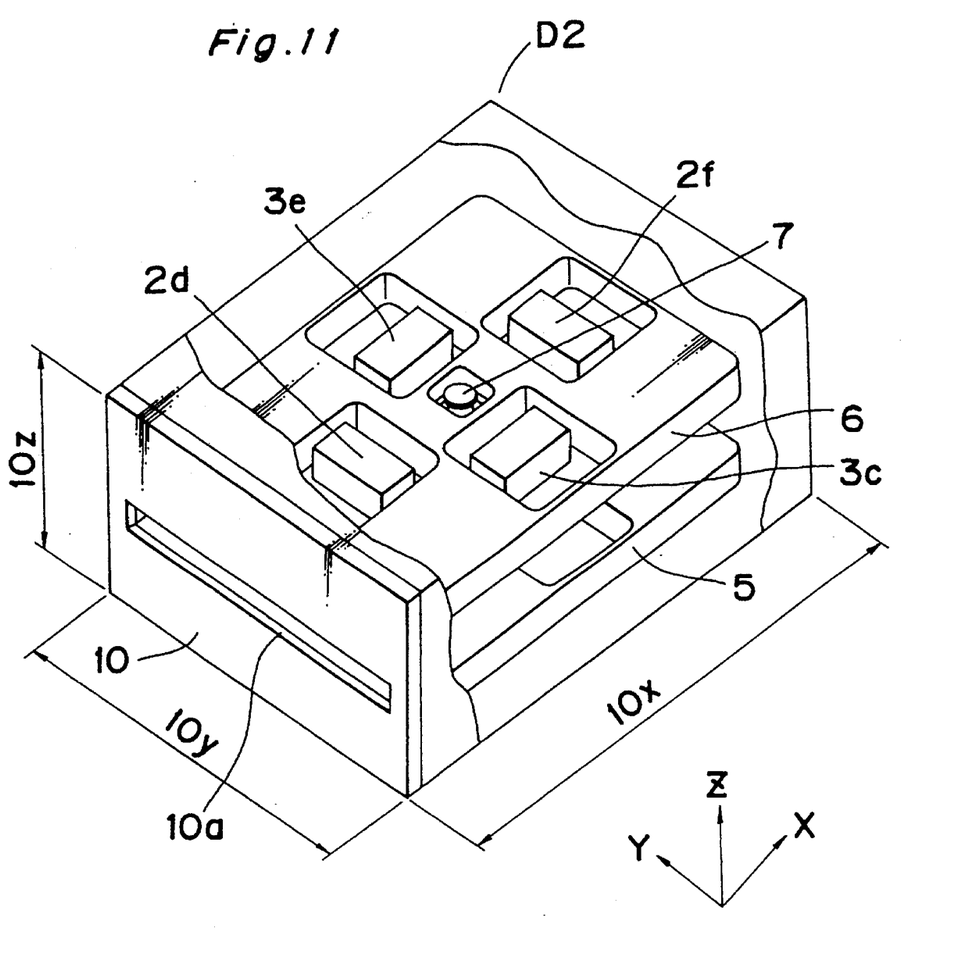
FIG. 11 is a view similar to FIG. 9, but indicating the disc device according to the optional specification.

FIG. 7 schematically depicts a disc device D2 according to the second embodiment of the present invention in which the disc 1' shown in FIG. 5 is accommodated. FIGS. 9 and 11 depict the disc device according to a standard specification and that according to an optional specification, respectively.

The disc 1' is made up of a first substrate and a second substrate bonded to each other, both of which are identical in structure. The disc 1' accommodated in the disc device D2 has a first surface confronting a drive base 5 located on the −Z axis side of the disc 1' and a second surface confronting a drive base 6 located on the +Z axis side of the disc 1'. Each of the first and second surfaces has a spiral information track 1T being continuous from the first information region 1Z1 to the fourth information region 1Z4. Because the first and second substrates are of the same structure, the direction of spiral on the first surface is opposite to that on the second surface, as viewed from one side of the disc 1'.

Accordingly, the disc device D2 is designed such that, when the disc 1' is driven by the motor 4 during recording or reproduction, a head located on one side of the disc 1' executes a spiral motion relative to the disc 1' from the inner circumference towards the outer circumference, whereas a head located on the other side of the disc 1' executes another spiral motion relative to the disc 1' from the outer circumference towards the inner circumference. The spiral motion mentioned above is a motion in which the head moves along the spiral information track 1T to successively scan it in a direction radially inwardly or outwardly of the disc 1' without jumping it. For the purpose of illustration of the present invention, the spiral motion on the first surface is executed radially outwardly, whereas that on the second surface is executed radially inwardly.

Figure 10A:
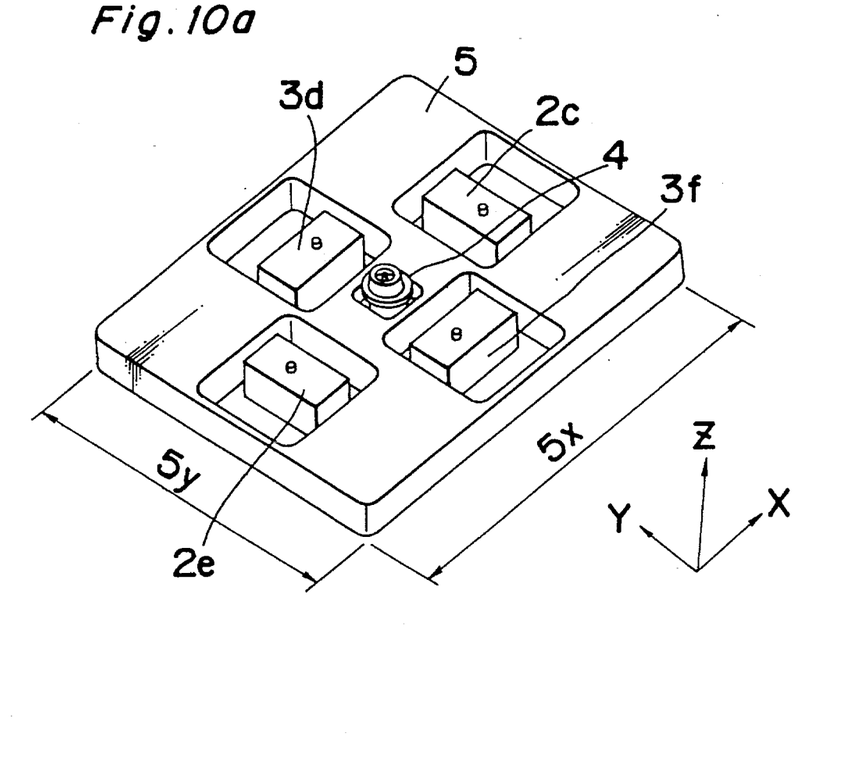
FIG. 10a is a perspective view of the first drive base mounted in the disc device according to the optional specification.
Figure 10B:
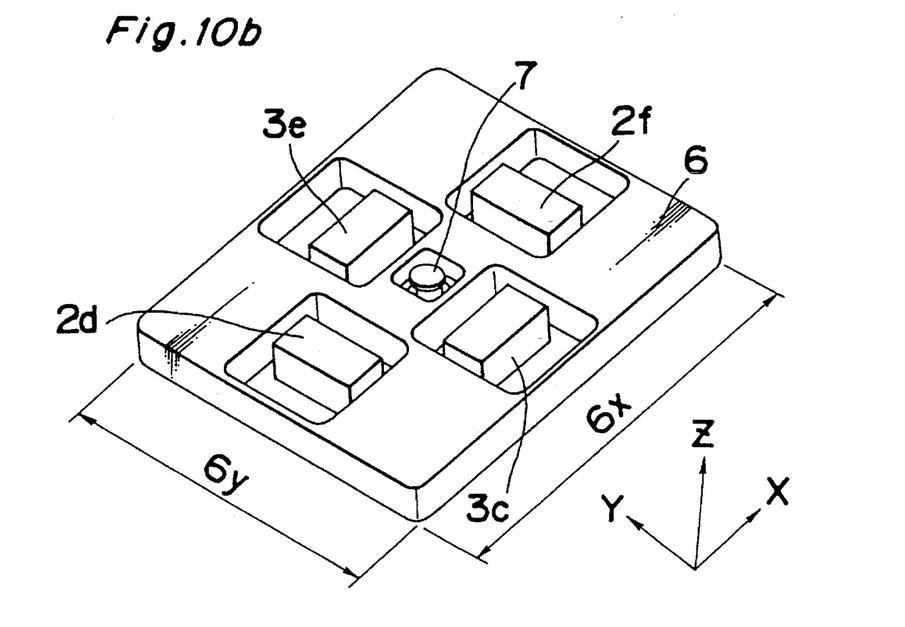
FIG. 10b is a view similar to FIG. 10a, but indicating the second drive base mounted in the disc device according to the optional specification.

As shown in FIGS. 9 and 11, the disc device D2 comprises a box-like housing 10, generally rectangular first and second drive bases 5 and 6 accommodated in the housing 10 so as to confront the first and second faces of the disc 1', respectively, a disc drive motor 4 (shown in FIGS. 8a and 10a) disposed at the center of the drive base 5 for driving the disc 1' mounted thereon, and a clamper 7 mounted on the second drive base 6 for securely holding the disc 1' between it and the disc drive motor 4. The housing 10 has a length of 10x, a width of 10y, and a height of 10z, as shown in FIGS. 9 and 11. The first drive base 5 has a length of 5x and a width of 5y, whereas the second drive base 6 has a length of 6x and a width of 6y, as shown in FIG. 7.

Figure 8A:
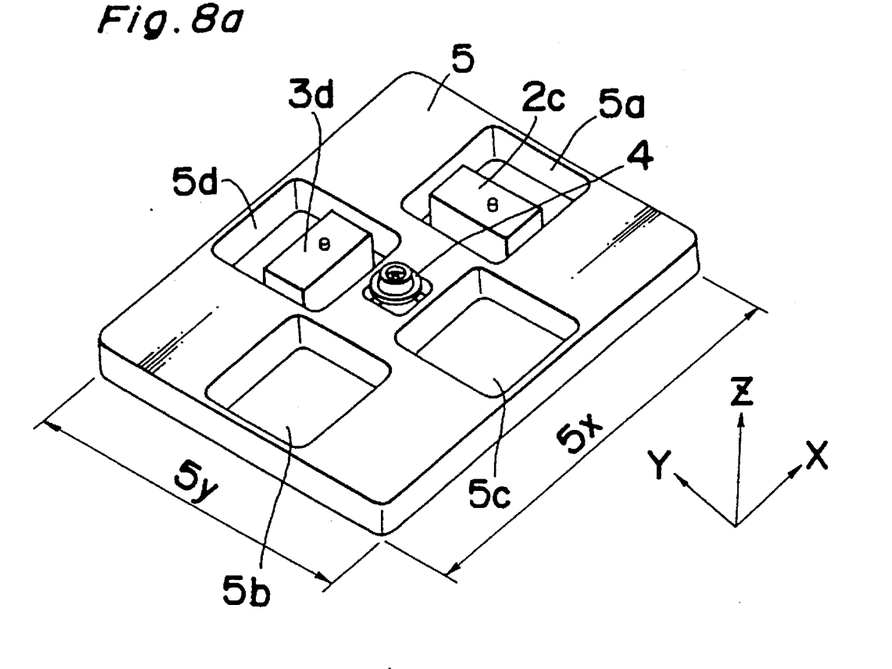
FIG. 8a is a perspective view of a first drive base mounted in the disc device according to the standard specification.
Figure 8B:
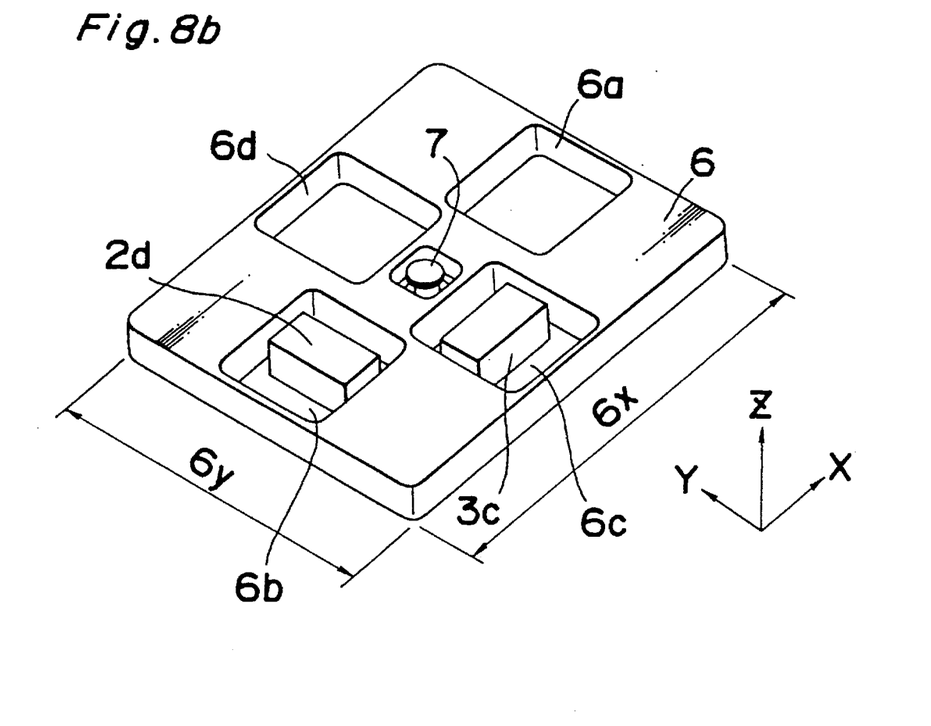
FIG. 8b is a view similar to FIG. 8a, but indicating a second drive base mounted in the disc device according to the standard specification.

As is the case with the first embodiment, each of the first and second drive bases 5 and 6 has four generally rectangular recesses 5a–5d or 6a–6d defined therein, as shown in FIGS. 8a and 8b, respectively. The first and second drive bases 5 and 6 are identical in structure to the drive base shown in FIG. 2, and are accommodated in the housing 10 so that the surface of the first drive base 5 on which the recesses 5a–5d are formed may be oriented in the same direction as that of the second drive base 6 on which the recesses 6a–6d are formed. Although the first drive base 5 is fixedly mounted in the housing 10, the second drive base 6 is vertically movably mounted in the housing 10 to thereby allow insertion or removal of the disc 1' into or from the housing 10.

The standard specification device shown in FIG. 9 has a first head 2c and a second head 3d accommodated in the recesses 5a and 5d of the first drive base 5, respectively, and also has a first head 2d and a second head 3c accommodated in the recesses 6b and 6c of the second drive base 6, respectively. The standard specification device has a slot 10a defined in that side wall of the housing 10 which is positioned on the −X axis side thereof. A disc cartridge (not shown) accommodating the disc 1' is inserted into the standard specification device through the slot 10a so that the disc 1' may be driven by the disc drive motor 4. The standard specification device also has a first control means 11c electrically connected to the first and second heads 2c and 3c to thereby control the movement of the first head 2c and that of the second head 3c in association with each other. The standard specification device further has a second control means 11d electrically connected to the first and second heads 2d and 3d to thereby control the movement of the first head 2d and that of the second head 3d in association with each other. The control by the first and second control means 11c and 11d is discussed later with reference to FIG. 12.

The optional specification device shown in FIG. 11 is similar in structure to the standard specification device shown in FIG. 9 except that the optional specification device further has a first head 2e and a second head 3f accommodated in the recesses 5b and 5c of the first drive base 5, respectively, and also has a first head 2f and a second head 3e accommodated in the recesses 6a and 6d of the second drive base 6, respectively.

As clearly shown in FIGS. 8a, 8b, 10a, and 10b, each of the first and second heads 2c–2f and 3c–3f is allowed to move within a space delimited by the associated recess. The first heads 2c–2f are allowed to move between the outer boundary 1b and the intermediate boundary 1c of the disc 1', while the second heads 3c–3f are allowed to move between the intermediate boundary 1c and the inner boundary 1a. In FIG. 7, the heads indicated by solid lines are at respective innermost positions, whereas those indicated by phantom lines are at respective outermost positions. Furthermore, the heads indicated outside of parentheses are located on the −Z axis side of the disc 1' so as to confront the first surface of the disc 1', whereas those indicated in the parentheses are located on the +Z axis side of the disc 1' so as to confront the second surface of the disc 1'.

The standard specification device operates as follows.

During recording, the first heads 2c and 2d are initially moved to specific locations of the outer information regions 1WO on the first and second surfaces of the disc 1', respectively. At the same time, the second heads 3c and 3d are moved to specific locations of the inner information regions 1WI on the second and first surfaces of the disc 1', respectively. Then, a desired information signal to be recorded such as, for example, a user's information signal is divided into two information signals, one of which is in turn recorded on the data portions 1D of the disc 1' by pairing the first head 2c and the second head 3c, and the other of which is in turn simultaneously recorded on the data portions 1D by pairing the first head 2d and the second head 3d. At this moment, if the first head 2c executes the spiral motion radially outwardly and is moved from the third information region 1Z3 to the fourth information region 1Z4 having a higher transfer rate, the second head 3c executes the spiral motion radially inwardly in association with that of the first head 2c and is moved from the second information region 1Z2 to the first information region 1Z1 having a lower transfer rate without jumping the information track 1T. The sum of the transfer rate of the first head 2c and the transfer rate of the second head 3c is always constant, and recording of one half of the desired information signal is carried out by the paired first and second heads 2c and 3c.

Likewise, if the first head 2d executes the spiral motion radially inwardly and is moved from the fourth information region 1Z4 to the third information region 1Z3 having a lower transfer rate, the second head 3d executes the spiral motion radially outwardly in association with that of the first head 2d and is moved from the first information region 1Z1 to the second information region 1Z2 having a higher transfer rate. The sum of the transfer rate of the first head 2d and the transfer rate of the second head 3d is always constant, and recording of the other half of the desired information signal is carried out by the paired first and second heads 2d and 3d.

During reproduction, the first heads 2c and 2d are moved to specific locations of the outer information regions 1WO of the first and second surfaces of the disc 1', respectively. At the same time, the second heads 3c and 3d are moved to specific locations of the inner information regions 1WI on the second and first surfaces of the disc 1', respectively. Then, one half of a desired information signal is reproduced by pairing the first head 2c and the second head 3c, and simultaneously, the other half of the desired information signal is reproduced by pairing the first head 2d and the second head 3d. The two halves are then combined for subsequent reproduction of the desired information signal. The spiral motion or the transfer rate at the data portion 1D is in the same relationship as that during the recording.

During recording or reproduction, the first control means 11c controls the first and second heads 2c and 3c so that one half of the desired information signal may be divided into two information signals or the divided information signals may be combined into the original one half of the desired information signal by the paired first and second heads 2c and 3c. Likewise, the second control means 11d controls the first and second heads 2d and 3d so that the other half of the desired information signal may be divided into two information signals or the divided information signals may be combined into the original half of the desired information signal by the paired first and second heads 2d and 3d.

Figure 12:
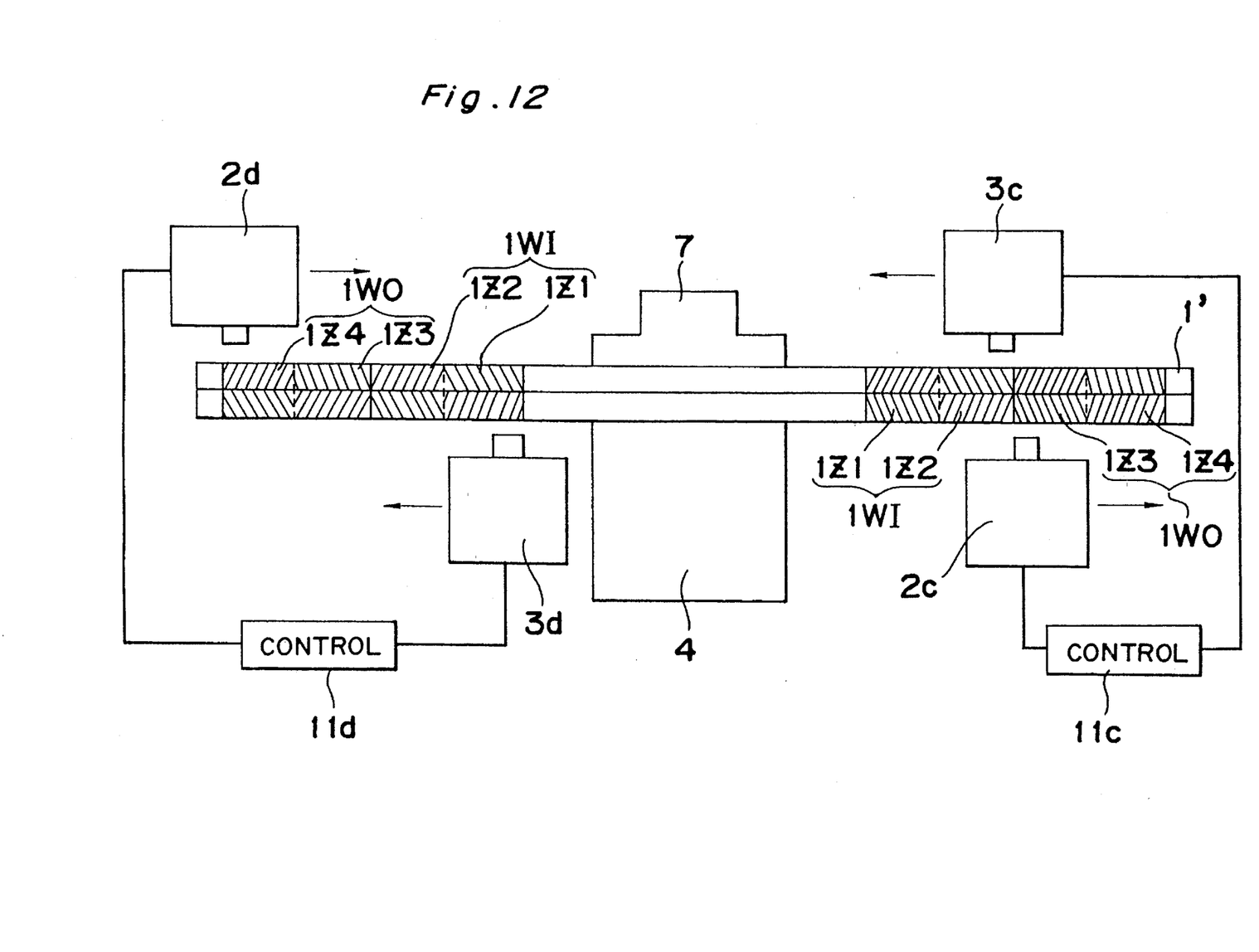
FIG. 12 is a view similar to FIG. 4, but indicating how to control a plurality of heads movably mounted in the disc device of FIG. 9.

FIG. 12 depicts the manner in which the first and second heads 2c and 3c are controlled by the control means 11c, and the first and second heads 2d and 3d are controlled by the control means 11d. When the first head 2c is moved radially outwardly from an innermost circumferential area of the outer information region 1WO on the first surface of the disc 1', the second head 3c is moved radially inwardly from an outermost circumferential area of the inner information region 1WI on the second surface of the disc 1'. In contrast, when the first head 2c is moved radially inwardly from an outermost circumferential area of the outer information region 1WO on the first surface, the second head 3c is moved radially outwardly from an innermost circumferential area of the inner information region 1WI on the second surface. Likewise, when the first head 2d is moved inwardly from an outermost circumferential area of the outer information region 1WO on the second surface, the second head 3d is moved radially outwardly from an innermost circumferential area of the inner information region 1WI on the first surface. In contrast, when the first head 2d is moved radially outwardly from an innermost circumferential area of the outer information region 1WO on the second surface, the second head 3d is moved radially inwardly from an outermost circumferential area of the inner information region 1WI on the first surface.

Description on the control of the first and second heads 2e and 3e and that of the first and second heads 2f and 3f is omitted because the control of the former and that of the latter are the same as the control of the first and second heads 2c and 3c and that of the first and second heads 2d and 3d, respectively.

On the other hand, the optional specification device operates as follows.

As is the case with the standard specification device, a desired information signal is divided into two information signals during recording, and the divided information signals are combined into the desired information signal during reproduction. More specifically, one half of the information signal is recorded or reproduced by the paired first and second heads 2c and 3c, and the other half of the information signal is recorded or reproduced by the paired first and second heads 2d and 3d.

The optional specification device, however, differs from the standard specification device in that the optional specification device can manipulate another information signal as follows.

A desired information signal, which is separate from the information signal manipulated by the paired heads 2c and 3c and the paired heads 2d and 3d, is divided into two information signals during recording, and the divided information signals are combined into the original information signal during reproduction. More specifically, one half of the desired information signal is recorded or reproduced by pairing the first head 2e and the second head 3e, and the other half of the desired information signal is recorded or reproduced by pairing the first head 2f and the second head 3f.

According to the optional specification device, the provision of two independent sets of two head pairs enables independent manipulation of two separate user's information signals. For example, information recorded by a first set of two head pairs can be immediately reproduced by a second set of two head pairs. Furthermore, when certain information has been recorded on or reproduced from a first information track by the first set, another information can be recorded on or reproduced from a second information track remote from the first information track by the second set so as to be continued to the information recorded or reproduced by the first set.

Accordingly, in connection with the heads associated with the first surface of the disc 1', it is sufficient if the first heads 2c and 2e which can move in the X direction confront only the outer information region 1WO, and the second heads 3d and 3f which can move in the Y direction confront only the inner information region 1WI. On the other hand, in connection with the heads associated with the second surface of the disc 1', it is sufficient if the first heads 2d and 2f which can move in the X direction confront only the outer information region 1WO, and the second heads 3c and 3e which can move in the Y direction confront only the inner information region 1WI. Even when heads of an ordinary size are employed as the first and second heads 2c–2f and 3c–3f, no mechanical interference takes place between the first heads 2c and 2e and the second heads 3d and 3f, and between the first heads 2d and 2f and the second heads 3c and 3e at the innermost circumferential areas of the disc 1'. Because of this, not only the use of special heads of a small size is not required, but also the innermost side of the information area can effectively be utilized.

Moreover, because it is sufficient if the second heads 3c–3f confront only the corresponding inner information regions 1WI, the size 5y and 6y of the drive bases 5 and 6 in the Y direction in which the second heads 3c–3f are movable can be reduced and, hence, the size 10y of the disc device can also be reduced. Particularly, in applications where the use of a disc having a diameter of 300 mm is desired, the size 10y of the disc device can be reduced to a size of not greater than 435 mm, thus enabling installation thereof on the 19-inch rack.

In addition, the sum of the transfer rate at which recording on or reproduction from the associated data portion 1D is carried out by the first head 2c according to the standard specification and the transfer rate at which recording on or reproduction from the associated data portion 1D is simultaneously carried out by the second head 3c according to the standard specification is rendered to be always constant. Likewise, the sum of the transfer rates by the paired first and second heads 2d and 3d according to the standard specification is maintained constant. Also, each of the sum of the transfer rates by the paired first and second heads 2e and 3e according to the optional specification and the sum of the transfer rates by the paired first and second heads 2f and 3f according to the optional specification is rendered to be always constant.

By doing so, the disc device according to the present invention realizes large capacity recording on the disc of the MCAV type to prolong the recording time, and enables recording on or reproduction from such a disc at a constant transfer rate. As a result, digital information such as, for example, NTSC composite signals can be readily recorded on or reproduced from the disc. Furthermore, in the disc of this type, because the transfer rate is varied according to the radial distance from the center thereof, the transfer rate at which recording or reproduction is carried out by four heads can be increased as compared with a disc of the CAV type having a data portion on or from which recording or reproduction is carried out at a constant transfer rate determined by an inner circumferential area of the disc.

Even if the disc device D2 is of a type in which the disc 1' is removably mounted therein, loading and unloading of the disc 1' in or from the disc device D2 can be easily carried out by rendering the direction of insertion of the disc 1' to the disc device D2 to be in agreement with the X direction and by directing the side wall of the housing 10 having the slot 10a frontwardly of the 19-inch rack.

In the second embodiment discussed above, the first heads 2c and 2e confronting the first surface of the disc 1' are disposed on the +X axis side and the −X axis side, respectively, and the second heads 3d and 3f confronting the first surface are disposed on the +Y axis side and the −Y axis side, respectively. Furthermore, the first heads 2d and 2f confronting the second surface of the disc 1' are disposed on the −X axis side and the +X axis side, respectively, and the second heads 3c and 3e confronting the second surface are disposed on the −Y axis side and the +Y axis side, respectively. However, the arrangement of all of the heads is not limited to that discussed in the second embodiment.

Figure 13:
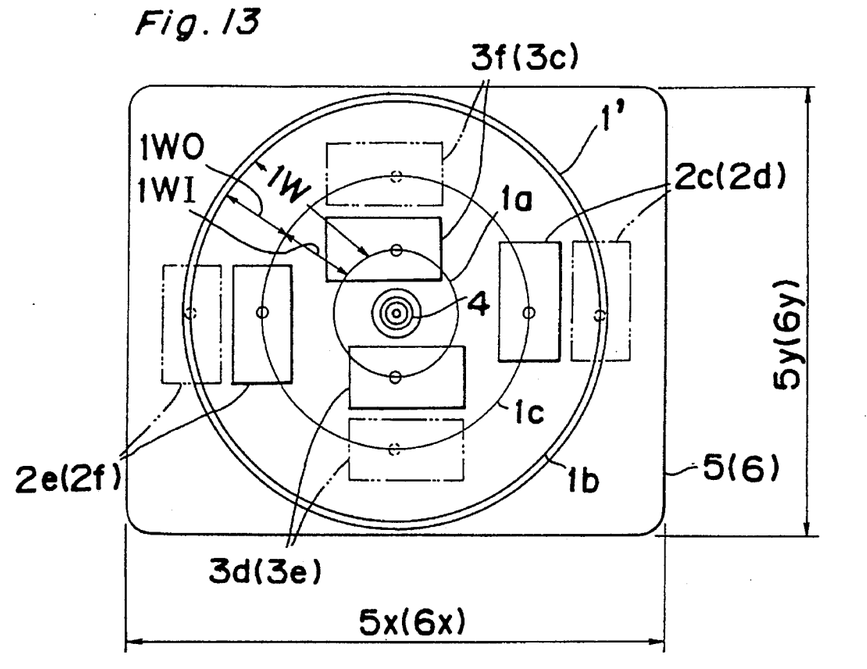
FIG. 13 is a view similar to FIG. 7, but indicating a modification thereof.

FIG. 13 depicts a modified head arrangement in which the second heads 3d and 3f, the first heads 2d and 2f, and the second heads 3c and 3e are replaced with each other, respectively.

Figure 14:
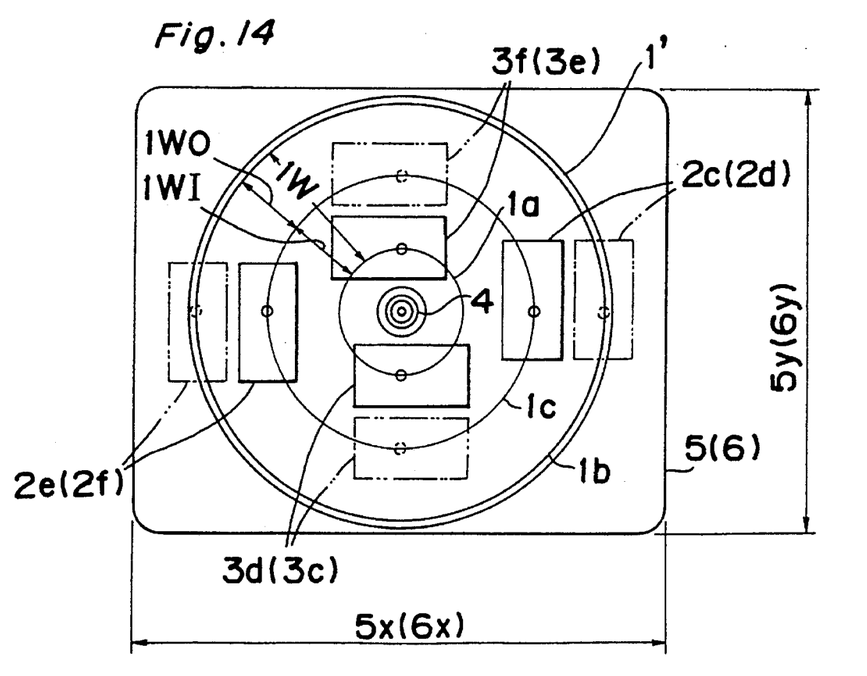
FIG. 14 is a view similar to FIG. 7, but indicating another modification thereof.

FIG. 14 depicts another modified head arrangement in which the second heads 3d and 3f are replaced with each other, and the first heads 2d and 2f are replaced with each other.

Figure 15:
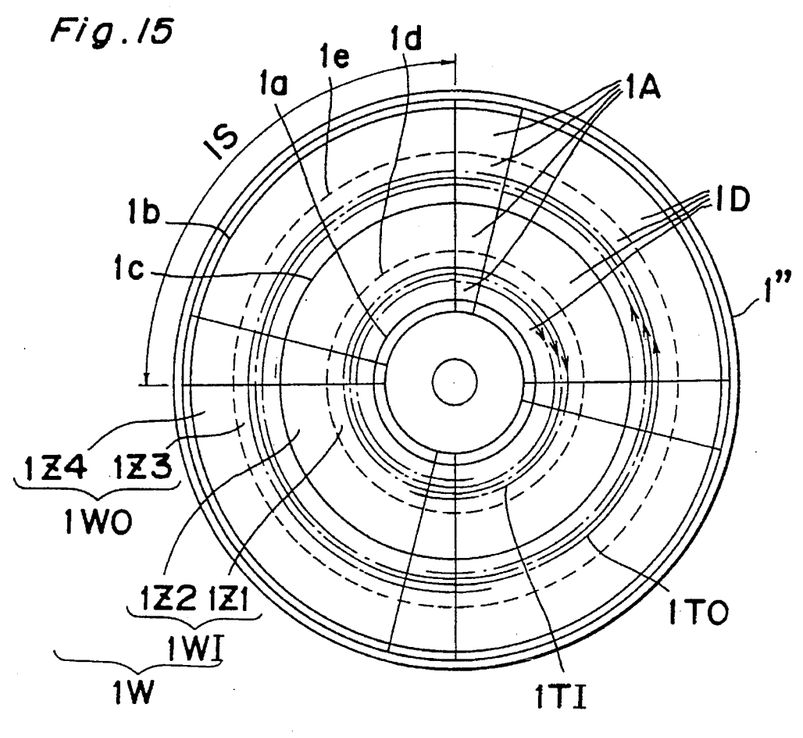
FIG. 15 is a view similar to FIG. 5, but indicating a modification thereof.

FIG. 15 depicts a disc 1'' having a first surface and a second surface opposite to each other, each of which has two continuous spiral information tracks 1TI and 1TO defined on the inner information region 1WI and the outer information region 1WO, respectively. The direction of spiral of the information track 1TI is opposite to that of the information track 1TO. With the exception of the information tracks, this disc 1'' is identical in structure to the disc 1' shown in FIG. 5 and can be used in the disc device D2 according to the second embodiment. In this case, however, recording or reproduction is carried out by two sets of two head pairs with each head pair including a first head and a second head confronting the same surface of the disc 1''. In this case also, the sum of the transfer rates by the paired first and second heads is maintained constant.

Figure 16:
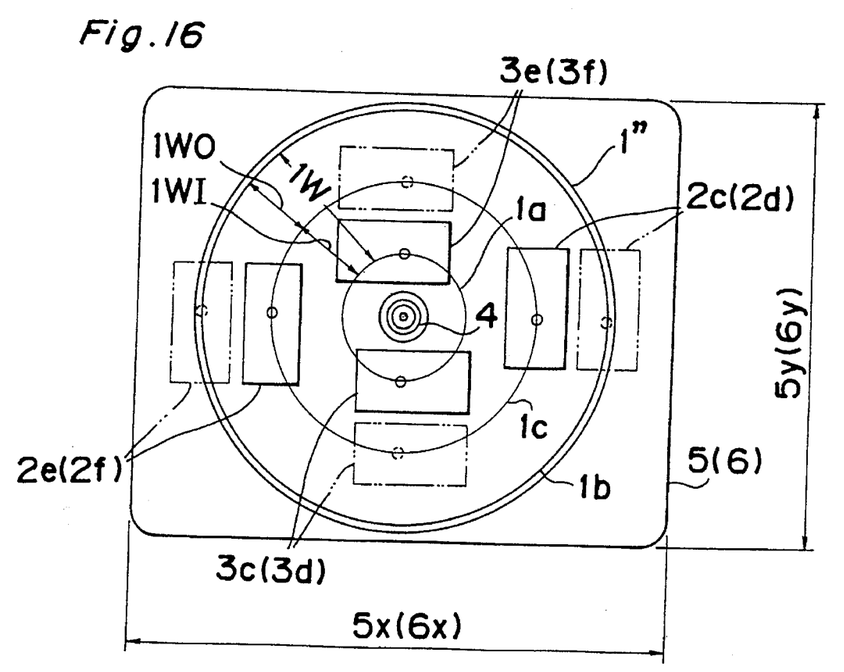
FIG. 16 is a view similar to FIG. 7, but indicating a still further modification thereof.

FIG. 16 depicts a further modified head arrangement to which the disc 1'' shown in FIG. 15 can be applied.

As shown in FIG. 16, the head pair 2c and 3c and the head pair 2e and 3e confront the first surface of the disc 1'', whereas the head pair 2d and 3d and the head pair 2f and 3f confront the second surface of the disc 1''.

In the second embodiment, although each of the inner information area 1WI and the outer information area 1WO is divided, as shown in FIG. 5, into two information regions, each of them may be divided into three or more information regions in order to enlarge the recording capacity of the disc or increase the transfer rate.

Furthermore, in the second embodiment, although recording on or reproduction from the divided information regions is carried at four different transfer rates, it may be carried out at two different transfer rates without dividing the inside of each of the inner and outer information areas 1WI and 1WO. In this case, because any boundary for changing the transfer rate does not exist in each of the inner and outer information areas 1WI and 1WO, pairing of the first and second heads can be arbitrarily selected.

A disc of the CAV type on or from which recording or reproduction is carried out at a constant transfer rate throughout the entire information area can be used in the disc device according to the present invention. In this case also, because the transfer rate does not change, pairing of the first and second heads can be arbitrarily selected.

In the second embodiment shown in FIGS. 8a, 8b, 10a, and 10b, although the head pair 2c and 3c and the head pair 2d and 3d are employed as the standard specification head pairs while the head pair 2e and 3e and the head pair 2f and 3f are employed as the optional specification head pairs, any two pairs of them can be employed as the standard specification head pairs. For example, the head pair 2e and 3e and the head pair 2f and 3f may be employed as the standard specification head pairs while the head pair 2c and 3c and the head pair 2d and 3d may be employed as the optional specification head pairs.

In the second embodiment, a desired information signal, for example a user's information signal, is divided into four information signals during recording, and the divided information signals are combined into the original information signal during reproduction using a first set of the head pairs 2c, 3c and 2d, 3d, while another desired information signal is divided into four information signals during recording, and the divided information signals are combined into the original information signal during reproduction using a second set of the head pairs 2e, 3e and 2f, 3f. However, all of the eight heads can be simultaneously used as one set for recording or reproduction of a desired information signal in a manner such that the desired information signal is divided, during recording, into eight information signals, which are later combined into the original information signal during reproduction.

The present invention is applicable to not only the optical disc, but also a magneto-optical disc or a magnetic disc.

In the above-described embodiments, each of the heads is of an integrated model including a light source and a light receiving portion for detecting reflected light from the disc, which model is designed to move radially of the disc. However, the present invention is also applicable to a separate model of a design wherein use is made of separate movable and stationary portions with both of the light source and the light receiving portion installed on the stationary portion while the movable portion is movable radially of the disc.

In recent years, development of a disc device capable of recording or reproducing dynamic images in digital form made up of NTSC composite signals, NTSC component signals, or high-vision signals is being increasingly pursued by increasing the device-wide transfer rate. To this end, recording or reproduction is carried out by dividing information or combining the divided information with the simultaneous use of a plurality of heads confronting one or both surfaces of the disc. Also, development of a disc device of a multi channel access type capable of independently manipulating a plurality of channels with respect to a single disc is being increasingly pursued wherein a plurality of information signals such as, for example, voice signals are independently recorded or reproduced by a plurality of heads disposed on one or both sides of the disc. The present invention is conveniently applied to the disc device capable of recording or reproducing the dynamic images in digital form at a high transfer rate or the disc device of the multi channel access type capable of accessing the plurality of voice signals.

Furthermore, development of a disc device having various optional functions is being pursued wherein information signals, for example image signals, are independently recorded or reproduced by a plurality of standard specification heads and a plurality of optional specification heads disposed on one or both sides of the disc. One of the optional functions is that recording or reproduction by the standard specification heads is continued to recording or reproduction by the optional specification heads, thereby enabling continuous recording or reproduction of broken information. Another optional function is that recording and reproduction are simultaneously carried out by reproducing, during recording of information by the standard specification heads, separate information with the use of the optional specification heads.

As is well known, there exist standard specification devices having only the standard specification heads and optional specification devices having both of the standard specification heads and the optional specification heads to effect the optional functions. The disc device according to the present invention satisfies both of the standard specification and the optional specification.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A disc device comprising:

a housing having an outer moving region and an inner moving region lying radially inwardly of the outer moving region;

a disc adapted to be accommodated in said housing and having a first surface and a second surface opposite to each other, said disc also having an information area defined on the first surface and divided into an outer information region and an inner information region lying radially inwardly of the outer information region;

first movable mounting means mounted in said housing and having a first head, said first movable mounting means movable in a first direction radially of said disc within a limited distance across the outer moving region so that the first head records or reproduces information on or from the outer information region; and second movable mounting means mounted in said housing and having a second head, said second movable mounting means movable in a second direction radially of said disc within a limited distance across the inner moving region so that the second head records or reproduces information on or from the inner information region, respectively, said second direction being perpendicular to the first direction;

wherein the first movable mounting means and the second movable mounting means do not interfere with each other.

2. The disc device according to claim 1, wherein the disc has a center area, an outer peripheral area, and a boundary formed between the inner information region and the outer information region, and wherein said second movable mounting means only moves between the center area and the boundary and the first movable mounting means only moves between the boundary and the outer peripheral area.

3. A disc device comprising:

a housing;

a disc adapted to be accommodated in said housing, said disc comprising:

(a) a first surface and a second surface opposite to each other, and (b) an information area defined on the first surface and divided into an outer region and an inner region lying radially inwardly of the outer information region, said inner region having a first outer boundary and a first inner boundary lying radially inwardly of the first outer boundary, said outer region having a second outer boundary and a second inner boundary lying radially inwardly of the second outer boundary, said first inner boundary lying radially inwardly of said second inner boundary;

a first moving member having at least one head, said first moving member only movable within a limited distance between the first outer boundary and the first inner boundary; and a second moving member having at least one head, said second moving member only movable within a limited distance between the second outer boundary and the second inner boundary.

* * * * *